(12) United States Patent
Marokhovsky et al.

(10) Patent No.: US 8,918,677 B1
(45) Date of Patent: Dec. 23, 2014

(54) METHODS AND APPARATUS FOR PERFORMING DATA VALIDATION IN A NETWORK MANAGEMENT APPLICATION

(75) Inventors: Serge Marokhovsky, Upton, MA (US); Christopher A. Chaulk, Franklin, MA (US); Yongmei Xu, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1987 days.

(21) Appl. No.: 10/955,805

(22) Filed: Sep. 30, 2004

(51) Int. Cl.
G06F 11/00 (2006.01)

(52) U.S. Cl.
USPC .............. 714/27; 714/100; 707/687; 726/1

(58) Field of Classification Search
None
See application file for complete search history.

(56) References Cited

U.S. PATENT DOCUMENTS

| | | | | |
|---|---|---|---|---|
| 5,940,847 | A * | 8/1999 | Fein et al. | 715/540 |
| 6,430,611 | B1 * | 8/2002 | Kita et al. | 709/223 |
| 6,732,124 | B1 * | 5/2004 | Koseki et al. | 707/202 |
| 6,839,747 | B1 * | 1/2005 | Blumenau et al. | 709/223 |
| 7,167,915 | B2 * | 1/2007 | Bendich et al. | 709/224 |
| 7,194,538 | B1 * | 3/2007 | Rabe et al. | 709/224 |
| 7,246,161 | B2 * | 7/2007 | Fujita et al. | 709/223 |
| 7,480,717 | B2 * | 1/2009 | Fellenstein et al. | 709/224 |
| 7,506,040 | B1 * | 3/2009 | Rabe et al. | 709/223 |
| 7,552,115 | B2 * | 6/2009 | Kalach et al. | 1/1 |
| 2002/0059263 | A1 * | 5/2002 | Shima et al. | 707/100 |
| 2003/0037187 | A1 * | 2/2003 | Hinton et al. | 710/1 |
| 2003/0208589 | A1 * | 11/2003 | Yamamoto | 709/224 |
| 2003/0212851 | A1 * | 11/2003 | Drescher et al. | 711/100 |
| 2004/0039891 | A1 * | 2/2004 | Leung et al. | 711/165 |
| 2004/0054656 | A1 * | 3/2004 | Leung et al. | 707/1 |
| 2005/0033757 | A1 * | 2/2005 | Greenblatt et al. | 707/100 |
| 2005/0055370 | A1 * | 3/2005 | Fukuda et al. | 707/103 X |
| 2005/0114338 | A1 * | 5/2005 | Borthakur et al. | 707/9 |
| 2005/0240986 | A1 * | 10/2005 | Yamamoto et al. | 726/1 |

* cited by examiner

*Primary Examiner* — Hung Le
(74) *Attorney, Agent, or Firm* — Krishnendu Gupta; Gerald P. Kazanjian

(57) ABSTRACT

A report generator of a storage area network management application includes a data validation mechanism that validates data related to managed resources operating in a storage area network. The data validation mechanism obtains first and second data sets concerning first and second characteristics of a resource operating in the storage area network and applies at least one data validation test using data sets to detect inconsistencies in data in the first and second data sets associated with the resource operating in the storage area network. Values can be compared in different columns of the same or different reports to detect report integrity errors or data mining errors. The report generator provides a storage area network management report based on data of the first data set and the second data set that accounts for inconsistencies in data associated with the resource as detected by the at least one data validation test.

31 Claims, 6 Drawing Sheets

FROM FIG. 5

222
CONTINUED...

226
DETECT THE INCONSISTENCY IN STORAGE CHARACTERISTICS OF DATA CONTAINED IN THE AT LEAST ONE STORAGE AREA NETWORK MANAGEMENT REPORT BY DETERMINING THAT A DATA VALUE IN AT LEAST ONE COLUMN OF THE AT LEAST ONE STORAGE AREA NETWORK MANAGEMENT REPORT IS INCONSISTENT WITH A COMPUTATION APPLIED TO AT LEAST N OTHER COLUMNS, WHEREIN N IS ANY POSITIVE INTEGER VALUE

227
DETERMINE THAT A DATA VALUE IN ONE COLUMN IN THE STORAGE AREA NETWORK MANAGEMENT REPORT IS NOT EQUAL TO A SUM OF CORRESPONDING DATA VALUES IN THE AT LEAST N OTHER COLUMNS

AND/OR

228
PERFORM DATA MINING VALIDATION TESTING BY APPLYING A COMPUTATION TO DATA VALUES OF THE FIRST AND SECOND DATA SETS TO IDENTIFY INCONSISTENCIES WITH CONFIGURATION OF RESOURCES OPERATING IN THE STORAGE AREA NETWORK

229
CONFIRM THAT THE DATA VALUES ASSOCIATED WITH AT LEAST ONE RESOURCE OPERATING IN THE STORAGE AREA NETWORK ARE WITHIN A REALISTIC OPERATIONAL RANGE

AND/OR

230
PERFORM A STORAGE AREA NETWORK RESOURCE COMPATIBILITY TEST TO DETERMINE COMPATIBILITY OF RESOURCES ASSOCIATED WITH THE FIRST AND SECOND DATA SET

*FIG. 6*

METHODS AND APPARATUS FOR PERFORMING DATA VALIDATION IN A NETWORK MANAGEMENT APPLICATION

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored in many high capacity data storage systems. Data storage system developers have responded to these types of data storage requirements by integrating host computer systems such as servers, data communications devices that provide switch fabrics, and large capacity data storage systems into networks called "storage networks" or "storage area networks" (SANs.)

In general, a storage area network is a collection of data storage systems (e.g., multiple disk arrays) that are networked via a switching fabric to a number of host computer systems that operate as servers. For example, host computers of the storage area network couple to and access data stored within the storage systems of the storage area network through a storage area network switch fabric on behalf of client computer systems that request such data. Due to the complexity of modern storage area networks, vendors of equipment that operate in such networks provide storage area network management software applications that allow an administrator of such a network to configure, control and manage resources within the storage area network. As an example, EMC Corp. of Hopkinton, Mass., USA manufactures and sells a storage area network management application referred to as Control Center. Control Center provides a variety of management, configuration and control capabilities for resources that operate in storage area network such as host computer systems, switches and storage arrays.

Conventional storage area network management applications such as Control Center typically provide graphical user interfaces (GUIs) enabling network managers to graphically manage, control and configure various types of hardware and software resources associated with a corresponding managed storage area network. For example, Control Center enables a network manager at a computer associated with the storage area network to request reports of how much data storage capacity within the storage area network is used by respective resources in the storage area network. Based on this information, the network manager can decide, among other things, how to allocate storage resources and determine at what point it is necessary to increase storage capacity of the storage area network.

SUMMARY

Certain conventional network management applications enable a network manager to request and view management reports associated with a storage area network. The management reports typically include information pertaining to resources in the storage area network and corresponding storage used by those resources. Reports of this nature are often tabular, with rows in a table identifying specific resources such as host computer systems or storage arrays, and individual columns indicating data values for different characteristics of storage associated with the resource identified by each row. As an example, a storage area network management report concerning host computer systems operating in the storage area network might indicate, for each file system associated with a particular host computer system, amounts of free storage, used storage and total storage available for data within that file system. Other reports that the storage management reporting application can generate might include reports indicating which data storage arrays maintain or store particular portions of file system data (e.g., within which devices).

Storage area network management applications that include report generation capabilities are often complex pieces of software that provide the ability to generate many different types of reports that contain large amounts of data. The data presented in such reports is sometimes produced as a result of calculations performed by the reporting application, while in other cases the data presented in reports is obtain from processing performed by a software or hardware entity other that the report generation tool. Generally, the data presented in such management reports is derived from management data that is initially collected by agent processes associated with the various types of manage resources operating within the storage area network. As an example, a storage array agent might operate (e.g., execute) in a host computer system in the storage area network and be responsible for collecting data storage and configuration information for one or more of the storage arrays operating in the storage area network. The data collected by the storage array agent is reported to a central storage area network management application server for storage within a managed resource database. The report generation portion of the storage area network management application, which in some instances may operate independently of the management application itself, is able to access data from the managed resource database for generation of the management reports. In some implementations, data within the managed resource database is converted to an intermediate format such as XML which the report generator operates upon for generation of management reports requested by a user of the report generation tool.

It is possible that errors may occur during storage area network management data collection and processing due, for example, to software defects or hardware operational errors. Occurrence of such errors can result in inaccuracies or inconsistencies within the data presented in conventional storage area network management reports. As an example, if a host agent operating on a host computer system collects data concerning amounts of free and used (i.e., allocated and/or configured) storage for a file system associated with a host computer system, a sum of the free and used amounts of data in the file system should be equivalent to a total amount of storage space allocated for use the file system. However, operational or data processing errors might result in the agent obtaining an inaccurate value for either the free or used space associated with the file system. Alternatively, an operating system might inaccurately report a total amount of space allocated to the file system. In either case, if such data is used in generation of a management report, the report will contain inconsistent and inaccurate data concerning the free, used and total amounts of space allocated to the file system. Conventional storage area network management applications that include report generation capabilities do not provide robust mechanisms for detecting such inconsistencies. As a result, reports generated by such management applications can contain inconsistencies and inaccuracies in the data presented in the reports.

Embodiments of the invention significantly overcome the aforementioned and other deficiencies of conventional network management applications. Specifically, embodiments of the invention operate in a storage area network management application and provide methods for validating data related to managed resources operating in a storage area network. Embodiments of the invention provide the capability to detect inconsistencies and inaccuracies in data presented in management reports generated by the storage area network management application. This includes the ability to identify report integrity errors such as inconsistencies in data values presented in columns in one or more management reports. To detect report integrity errors, embodiments of the invention can perform inter-column validation testing that provides for validation of data within columns of a single report, or in the case of cross-report validation, data from different reports can be cross-referenced in order to detect inconsistencies or inaccuracies with the data.

Using the simple example presented above of data storage allocated to a file system of a host computer, embodiments of the invention can perform report integrity checking to ensure, for example, that summations of free and used storage space associated with the file system are substantially equivalent to a total amount of storage space that is supposed to be allocated to the file system. If the sum total of the free and used space is not substantially equal and total amount space that is reported to be allocated to the file system, embodiments of the invention are able to indicate this inaccuracy to a user of the storage area network management application. Many other data validation calculations are possible as well using data from one or many different reports. In this manner, during report generation, a user is not presented with inaccurate data.

In addition, embodiments of the invention are able to perform data mining validation testing by, for example, applying a computation to data values from the same or different data sets (e.g., from different reports, of from different columns of data, or from calculated values derived form report data) to identify inconsistencies with configuration of resources operating in the storage area network. Data mining validation testing thus allows embodiments of the invention to detect, for example, that data values associated with a resource operating in the storage area network are within realistic operational ranges. Another example of data mining validation testing provided by embodiments of the invention allows such embodiments to perform a storage area network resource compatibility test to determine compatibility of resources associated with data used in the test. As an example, if an operating system is limited to access devices below a certain maximum size, if report data from the same or different reports indicates it is possible for a host using that operating system to access a device that exceeds the maximum size, the data mining validation testing can indicate this situation to the operator for remedial action.

As a result, embodiments of the invention are able to detect configuration and operational potential problems based on inconsistencies or inaccuracies in data associated with storage area network management reports. Such configuration problems can include software configuration inconsistencies identifying incompatible software operating in the storage area network; identification of firmware upgrades that may be required for a resource operating in the storage area network; identification of configuration inconsistencies associated with a storage array, switch or a host operating in the storage area network; and identification of connectivity inconsistencies of a coupling of resources operating within the storage area network that may indicate that such resources are improperly coupled with another.

In one configuration, during operation, embodiments of the invention obtain a first data set concerning first characteristics of a resource operating in the storage area network. The first data said may be, for example, data values associated with one column of data in a specific management report data set of file. In addition, embodiments of the invention obtain a second data set concerning second characteristics of the resource operating in the storage area network. The second data set maybe, for example, data values associated with another column of data in the same or in a different report or file. Data sets of report data may be stored, for example, as XML data files. Alternatively, the data associated with the first and second data said may be produced from a calculation perform on certain management report data.

Embodiments of the invention apply at least one data validation test using the first data set and the second data set. It is noted that other data sets can be included in this data validation test as well, such as a third data set, a fourth data set and so forth. The data validation test(s) detect inconsistencies in data in the first and second data sets (and others, if included) associated with the resource operating in the storage area network. The data validation tests can include, for example, mathematical computations to obtain a result that is then compared to data from the data sets, or any type of computation to determine accuracy of data in two or more data sets. Note that if more than two data sets are used, a first and second data set are implicitly included in a number of different data sets from which data is used in the data validation testing. The testing provided by the data validation tests can include cross-column validation, equality testing, and can provide report filtering to limit data shown in reports to only accurate data, while hiding or masking inaccurate data. Storage area network resources to which data validation testing can be applied include all types of host resources such as file system data, logical volume data, databases, volume groups, and so forth. In addition, storage array data can be tested to ensure that amounts allocated to devices are accurate in comparison with host data indicating amounts of data stored on storage array devices. It is to be understood that embodiments of the invention are not limited in the types of report data validation testing that can be performed during report generation.

In response to such testing, embodiments of the invention provide a storage area network management report based on data of the first data set and the second data set (and on any other data that may be used in testing) that accounts for inconsistencies in data associated with the resource as detected by the data validation test(s). As an example, if inconsistencies are detected in report data, embodiments of the invention can indicate an error where the data would have appeared in the report had the inconsistency not occurred.

In other embodiments, if the data validation mechanism has knowledge that certain data values are more reliable in their accuracy than others, then the data validation mechanism can correct the inconsistency using a correction calculation based on the data in the first and second data sets. As an example, the report generator may be configured (e.g. programmed) with knowledge that totals and free storage space are likely to be accurate since they are collected from the operating system. However, data indicating amounts of used storage may be less accurate since an agent may have to perform a summation operation on each file in a file system, for example, to obtain total amounts of used storage space. As such, chances of inaccuracies in used storage space might be higher that for free and total storage. In such cases, if an inconsistency is discover between a sum of free and used space in comparison to total space, at the option of a user, the data validation mechanism can perform an inference or correction of such data by calculating the different between the total and free space in order to compute the used amount of space. This used value is thus derived or inferred in this example embodiment on data known to be highly reliable. The used data value that the data validation mechanism infers in this manner is shown in the report as corrected data, such as by highlighting this data value with a different color font, or a different background color, or by placing this value in quotations. This alerts the user that this data value was derived or calculated based on a data inconsistency. In this manner, the inconsistency in data is corrected and the data validation mechanism can indicate the data on a management report, for which the inconsistency was corrected, as being corrected data in place of inconsistent data. Thus that a user viewing the report is not presented within the inconsistent data, but is presented with data indicated as corrected data. This simple example of data correction is provided by way of example only, and more complex calculations resulting in corrected data values are intended to be included within the scope of this invention.

Besides the method embodiments disclosed, embodiments of the invention include a computerized device (e.g., a host computer, workstation, etc.) configured to support the method operations and steps disclosed herein as embodiments of the invention to perform different types of data validation in a storage area network management application. In such embodiments, the computerized device includes a memory system, a processor (e.g., a processing device), a display and an interconnection mechanism. The interconnection mechanism supports communications among the processor, the memory system and the display. The memory system is encoded with a software management application that, when executed on the processor, produces a management process including a data validation mechanism capable of performing data validation on management data associated with resources operating in storage area network. It is to be understood that data validation in accordance with embodiments of the invention is not limited for use in generation of management reports. Rather, such validation techniques as those disclosed herein can be utilized by storage area network management processes to perform validation of data, for example, collected from aging processes operating in a storage area network. Thus, while the data validation techniques explain herein are described with reference to a report generation process, such techniques can be implemented within the general processing of a storage area network management application as well.

Yet other embodiments of the invention disclosed herein include software programs to perform the method embodiments and operations disclosed herein. More particularly, a computer program product (e.g., a computer-readable medium) including computer program logic encoded thereon may be executed on a computerized device to provide the data validation techniques as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

It should be understood that the system of the invention can be embodied as a software program or as a software program operating in conjunction with corresponding hardware.

Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIGS. 5 and 6 are a flow chart of more detailed processing steps performed in accordance with example embodiments of the invention to perform dynamic run-time report data validation and/or correction.

DETAILED DESCRIPTION OF PREFERRED EMBODIMENTS

Figure 1:
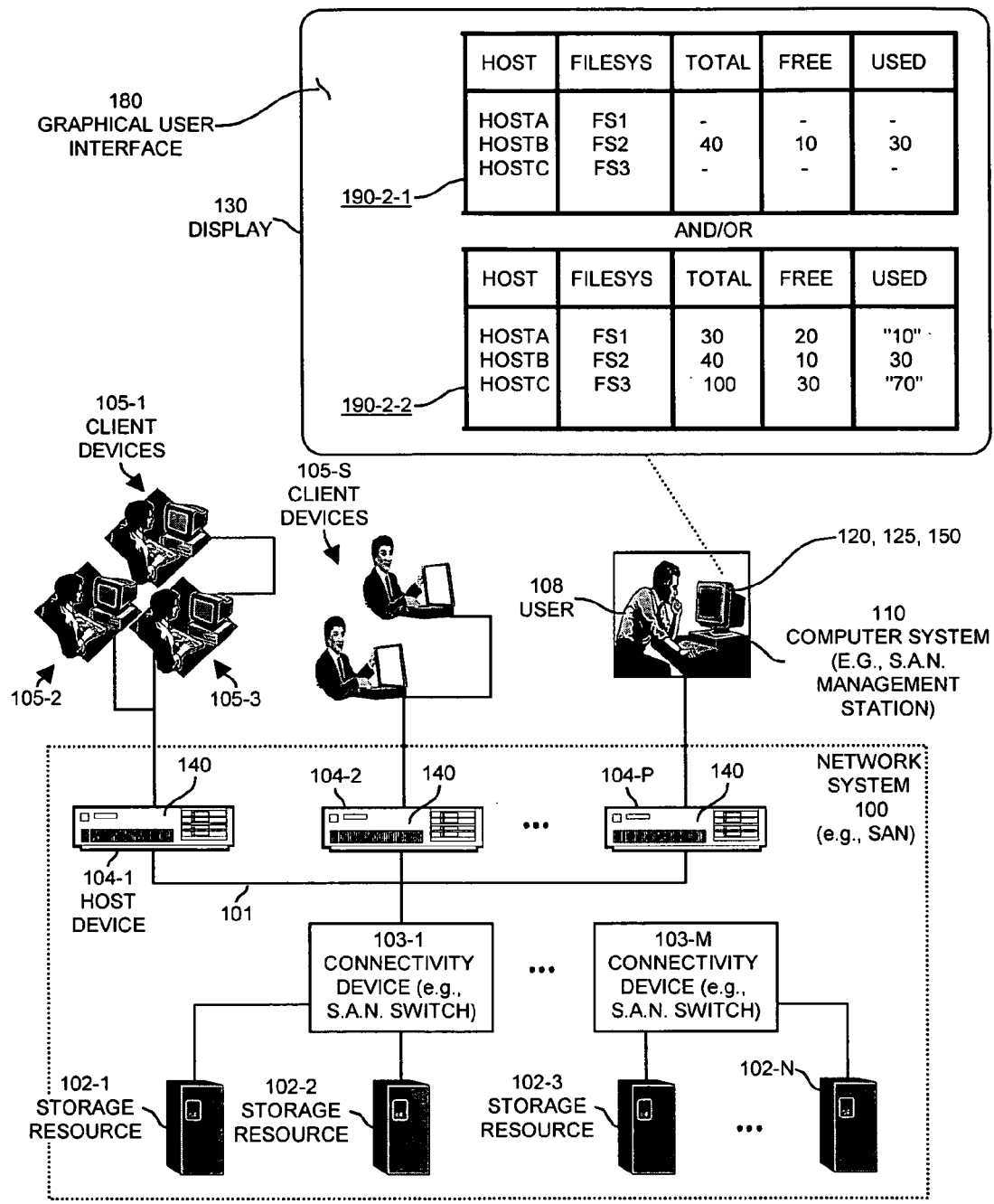
FIG. 1 illustrates a storage area network environment including a storage area network management computer system operating a storage area network management application equipped with a data validation mechanism configured in accordance with example embodiments of the invention.

FIG. 1 illustrates an example storage area network environment suitable for use in describing example embodiments of the invention. As shown in FIG. 1, a storage area network 100 includes one or more connectivity devices such as storage area network switches 103-1 through 103-M that couple a plurality of host devices 104-1 through 104-P (e.g., servers) to a plurality of storage devices 102-1 through 102-N (e.g., storage arrays). Client computer systems 105-1 through 105-S can provide data access requests to the host computer systems 104 for access to data maintained within the storage devices 102 in the storage area network 100.

The network management computer system 110 is a computerized device such as a workstation, personal computer, terminal console or the like configured with a storage area network management application 120 that includes, in this example, a report generator 125. The report generator 125 contains a data validation mechanism 150 configured in accordance with embodiments of the invention that can perform dynamic, real-time (i.e., run-time) data validation of report data presented in management reports 190 on the graphical user interface 180. In one configuration, the report generator 125 may be, for example, a separate software tool that operates in conjunction with the storage area network management application 120 to allow the user 108 to view reports 190 concerning the day-to-day operation of resources 102 through 104 in the storage area network 100. In operation, a user 108 such as a storage area network administrator interacts with the storage area network management application 120 executing on the computer system 110 using the graphical user interface 180 presented on the display 130. Specifically, the user 108 can operate the report generator 125 to produce management reports 190 in the graphical user interface 180 such as the example report 190 shown in FIG. 1. A report 190 is generated based on management data collected by agents 140 that operate within hosts 104 as part of the storage area network management application 120.

Figure 2:
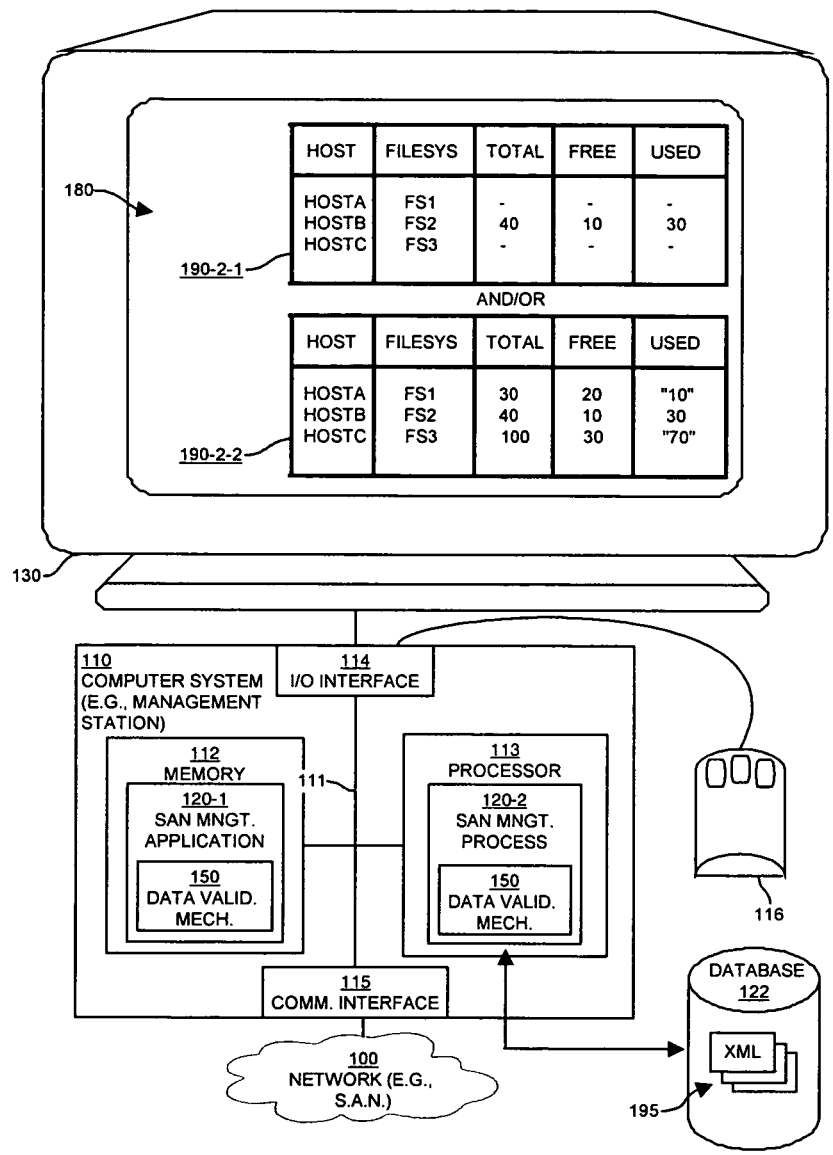
FIG. 2 is a more detailed diagram of a storage area network management computer system operating a storage area network management application equipped with a data validation mechanism in accordance with embodiments of the invention.

FIG. 2 is a block diagram illustrating example architecture the computer system 110 (e.g., a storage area network management station) configured according to embodiments of the invention. The computer system 110 may be a computerized device such as a personal computer, workstation, portable computing device (e.g., laptop), console, network terminal or the like. As shown, the computer system 110 of the present example includes an interconnection mechanism 111 such as a data bus, mother board or other circuitry that couples a memory 112, a processor 113, an input/output interface 114 and a communications interface 115. Peripheral devices 116 (e.g., one or more viewer controlled devices such as a keyboard, mouse, etc.) couple to processor 113 through I/O interface 114 and enable the user 108 (FIG. 1) to provide input commands and thus generally control display management functions associated with graphical user interface 180. A database 122 stores report data 195 associated with managed entities (e.g., hardware and software entities associated with host devices 104, storage resources 102, etc.) in network system 100. The report data 195 may be, for example, XML files containing data values for rows and columns of various reports. This report data 195 may be prepared nightly based on data collected form the agents 140 (FIG. 1) that operate in the storage area network 100. Communications interface 115 enables computer system 110 (and corresponding user 108) to communicate with other devices (i.e., resources) associated with network 100.

As shown, memory 112 is encoded with storage area network management application 120-1 supporting generation, display, and implementation of functional operations of graphical user interface 150. The storage area network management application 120-1 includes a data validation mechanism 150. In one configuration, the data validation mechanism 150 is included within a report generator 120 that operates in conjunction with the storage area network management application 120-1. In an alternative configuration, the data validation mechanism 150 is an integral part of the storage area network management application 120 and can be used to validate data show the user 108 during the process of network management.

The storage area network management application 120-1 may be embodied as software code such as data and/or logic instructions (e.g., code stored in the memory or on another computer readable medium such as a disk) that supports processing functionality according to different embodiments of the invention as described herein.

During operation, processor 113 accesses memory 112 via the interconnection mechanism 111 in order to launch, run, execute, interpret or otherwise perform the logic instructions of the storage area network management application 120-1. Execution of storage area network management application 120-1 produces processing functionality in the storage area network management process 120-2. In other words, the storage area network management process 120-2 represents one or more portions of storage area network management application 120-1 (or the entire application 120-1) performing, executing, running or otherwise operation within or upon the processor 113 in the computerized device 110.

It should be noted that the storage area network management application 120 executed in computer system 110 is represented in FIG. 2 by either one or both of the storage area network management application 120-1 and/or the storage area network management process 120-2. For purposes of the discussion of the operation of embodiments of the invention, general reference will be made to the storage area network management application 120 that includes a data validation mechanism 150 (that may or may not be part of a report generator tool or sub-process) as performing the various steps and functional operations to carry out the features of embodiments of the invention.

It should also be noted that embodiments of the invention include the storage area network management application 120-1 itself (i.e., the un-executed or non-performing logic instructions and/or data). The storage area network management application 120-1 may be stored on a computer readable medium such as a floppy disk, hard disk or in an optical medium. The storage area network management application 120-1 may also be stored in a computer readable medium such as a memory system such as in firmware, read only memory (ROM), or, as in this example, as executable code within the memory system 112 (e.g., within Random Access Memory or RAM). In addition to these embodiments, it should also be noted that other embodiments of the invention include the execution of storage area network management application 120-1 in processor 113 as the storage area network management process 120-2. Those skilled in the art are to understand that the computer system 110 may include other processes and/or software and hardware components not shown in this figure, such as an operating system that controls allocation and use of hardware resources.

Display 130 need not be coupled directly to computer system 100. For example, the storage area network management application 120 can be executed on a remotely accessible computerized device. In this instance, the graphical user interface 150 may be displayed locally to the user (e.g., on a console or web-based graphical user interface), while the storage area network management application/process 120 is executed remotely (e.g. on a server).

To generate displayed information in graphical user interface 150, the host computer system 110 (e.g., storage area network management process 120-2) uses information from management and report data 195 stored in database 122. The graphical user interface 180 in this example displays a management report 190 that includes management data 195 (e.g., information presented, in this example, in rows and columns of a table) processed at run-time by the data validation mechanism 150 as explained herein. The data 195 for management reports 190 originates from agent processes 140 that execute within host devices 104 as part of the storage area network management application 120. The agent processes 140 periodically and/or continually collect operational data concerning configuration and operation of the managed resources 102 through 104 (i.e., hosts, switches, storage arrays and any other managed resources) operating within storage area network 100. The agents 140 report the collected management data back to the storage area network management application 120 operating in the management computer system 110 and the management data is stored within a database 122. Note that data collected by agents can be post-processed and converted to other formats, such as an XML format. When the user 108 desires to view data associated with resources 102 through 104 operating in the storage area network 100, the user 108 is able to operate the report generator 125 component of the storage area network management application 120 to produce the graphical user interface 180 such as that shown in FIGS. 1 and 2.

According to embodiments of the invention, management data presented in the graphical user interface 180 (e.g., report data) can be validated by the data validation mechanism 150 that can detect inaccuracies or inconsistencies in such data (e.g., inconsistencies in data collected by the agent processes 140). In the example management reports 190-2-1 and 190-2-2 shown in FIGS. 1 and 2, each management report 190 includes data operated upon by the data validation mechanism 150 prior to display within the graphical user interface 180.

Briefly, in the example management report 190-2-1, the first and third rows of data contain null data indicators shown as "-" characters to indicate to the user that data for these report positions is either unavailable or was considered inaccurate or inconsistent by the data validation mechanism 150 explained herein. The other example management report 190-2-2 shows the outcome of processing of another embodiment of the data validation mechanism 150 that can perform data correction. In the example report 190-2-2, the first and third rows of data contain null data value in quotes (i.e., "10" and "70") to indicate to the user 108 that data for these report positions was considered inaccurate or inconsistent by the data validation mechanism 150 explained herein, and that the data validation mechanism 150 has computed, calculated or otherwise inferred a corrected value for this data. In other words, the quoted values are corrected values (or provide values for missing data that was not available) and are derived from calculations using data from other data sets, such as other rows and columns in the same or from different reports.

Figure 3:
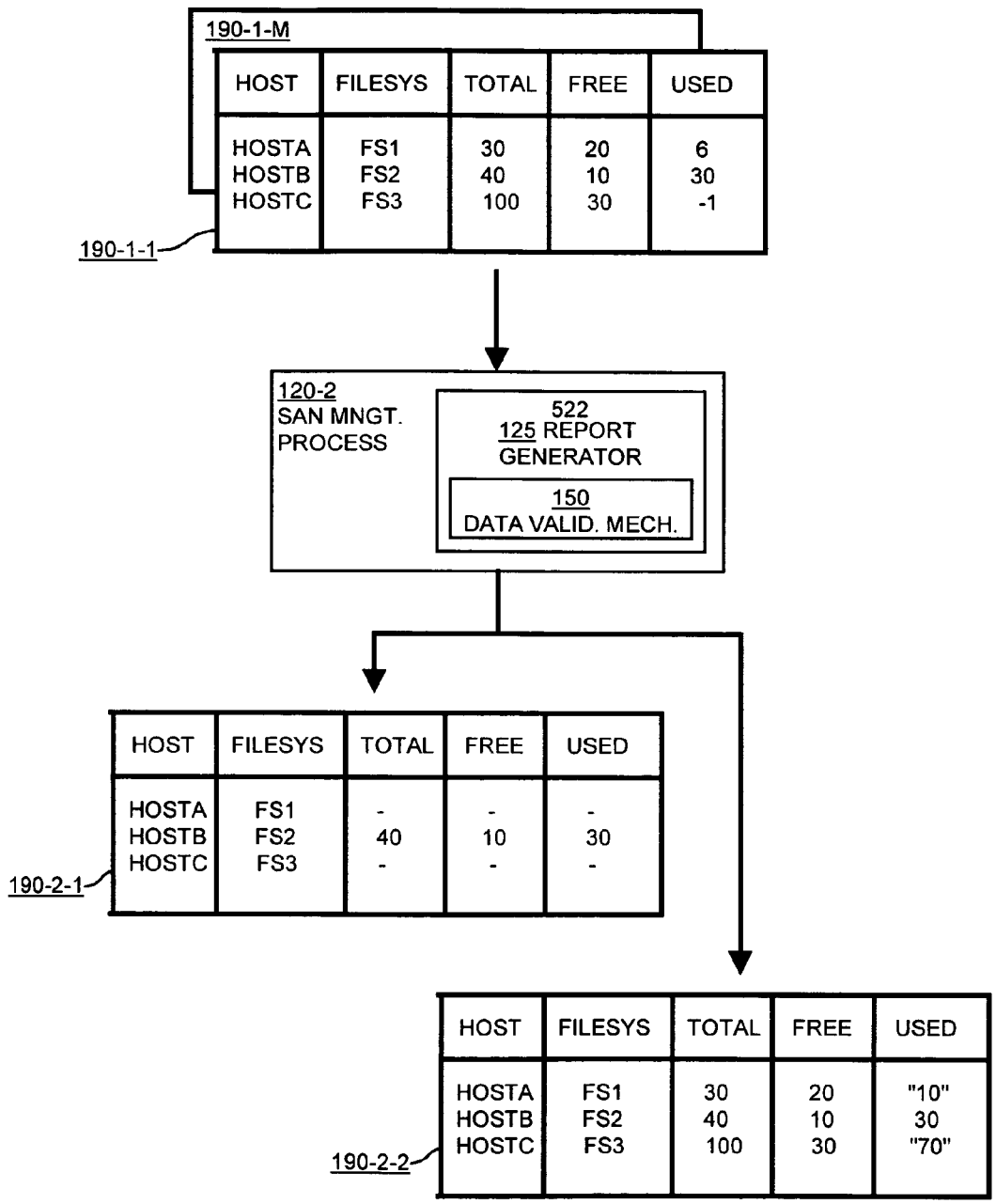
FIG. 3 illustrates an example of how a management report data containing data inconsistencies and inaccuracies can be processed by the data validation mechanism of this invention to produce example management reports that account for the inconsistencies using either report correction or report filtering.

FIG. 3 illustrates two examples of how data to be presented within a simplified management report 190-1 containing rows and columns of management data is modified (e.g., during run-time upon request for the report from the user 108) to produce either management report 190-2-1 (an example of a null data report) or report 190-2-2 (an example of a corrected report). In this example, the upper management report 190-1 reflects data that is not yet processed according to the data validation mechanism 150 of embodiments of the invention and thus contains inaccuracies or inconsistencies. Conventional storage area network management applications that are not equipped with embodiments of the invention would show this report 190-1 as it appears at the top of FIG. 3. Note that there may be many other reports 190-M that can be used to process embodiments of the invention.

The lower management reports 190-2-1 and 190-2-2 illustrate examples of how the management report 190-1 appears if processed by the report generator 125 containing the data validation mechanism 150 to account for inconsistencies in the data of the upper management report 190-1. In this simple example, the rows in the report 190 indicate amounts of storage allocated to file systems (FS1 . . . FS3) of host computer systems 104 (HOSTS A, B and C) operating in the storage area network 100. Column 3 of the report 190 indicates total amounts of storage space allocated to each file system, while columns 4 and 5 indicate how the total amount of storage space is divided into free and used amounts of storage space, respectively, for each file system of each host. In a correctly operating storage area network management application where no inconsistencies or inaccuracies exist in data processing, the total amount of storage space (column 3) of a file system should be equal (or substantially equal if, for example, rounding is used) to the sum of the free and used amounts of storage space (columns 4 and 5). However, in the example upper management report 190-1 in FIG. 3, due to one or more data processing or data collection errors that have occurred, values for reported total, free and used storage space contain inaccuracies.

Specifically, in row 1 of report 190-1, the total storage allocated to the file system FS1 for host A is shown as 30 GB, while the free and used amounts (column 4 and 5) are shown as 20 GB and 6 GB, respectively. These values would sum to a total of 26 GB (a value that is not substantially equal to 30 GB). As another example, in row 3, the total storage allocated to the file system FS3 for host C is shown as 100 GB, while the free amount (column 4) is shown as 30 GB but the used amount is shown as "−1". The "−1" value in the "used" column 5 for FS3 might indicate, for example, that such data is unavailable from an agent 140 or that a calculation made by the agent 140 to obtain or produce this value experienced an error. Nevertheless, the total amount of 100 GB does not properly reflect the displayed amounts of free and used space and thus the upper report 190-1 shows this inaccuracy or inconsistency. Such errors can be introduced into the data shown in management reports 190 in a variety of ways that are beyond the scope of this discussion. Brief examples include calculation errors, software defects, hardware errors, unavailability of certain data required for calculation, failure or slowness of agents 140, and so forth. As a simple example, total and free amounts of space might be data values maintained by the operating system and that are accessible to a host agent 140 operating on the hosts, while the used amount of storage space might need to be calculated by the agent 140 operating in the storage area network 100 by summing amounts of data consumed by each file that is contained in the file system directory. It may be the case that an agent 140 is unable to obtain the sizes of all files in the file system due to one or more file reading errors and thus the used amount of used space ends up being inaccurately reported by the agent 140, or not reported at all. The point of this simple example is to illustrate how a management report 190-1 produced without operation of embodiments of the invention can contain inconsistencies in the data presented in the report.

The management reports 190-2-1 and 190-2-2 shown at the bottom of FIG. 3 illustrate how the data validation mechanism 150 can operate to process management report data to account for such inaccuracies or inconsistencies in data by either showing inconsistent data as null data (e.g., as a 0 values or as "-" characters), or by correcting such data based on certain assumptions in the accuracy of certain data. Specifically, in the report 190-2-1, since the summation of columns 3 and 4 (20 GB free+6 GB used space) for file system FS1 does not match the total file system space in column 2 (30 GB), the data validation mechanism 150 has accounted for this inconsistency by replacing data values for all three columns for file system FS1 with the "-" character to indicate to the user 108 that there has been a data inconsistency error. In alternative arrangements, other designations such as "error", "0", and "null" could be used to indicate an inconsistency was present.

According to an alternative embodiment of the invention shown in report 190-2-2, the data validation mechanism 150 can perform data correction on the report data from report 190-1. An example of data correction is shown in the inconsistency for file systems FS1 and FS3 of hosts A and C of the example report 190-1 in FIG. 3 as compared this same hosts and file systems in the lower report 190-2-2. In particular, in this simple example, the data validation mechanism 150 has been able to infer the used amount of storage space to be equal to "10" and "70" GB, respectively, since the total amounts of storage space allocated to FS1 and FS3 are 30 and 100 GB, respectively, and the free amounts of storage space are 20 and 30 GB respectively. Thus, the data validation mechanism 150 in this example accounts for the inconsistency by assuming the total and free amounts are correct and applies an error correction calculation on the report data that calculates the used space (column 5) as the difference between the total and free space (columns 3 and 4). It is to be understood that embodiments of the invention do not have to implement error correction calculations and in some cases such correction are not possible due to lack of knowledge about which data is accurate as opposed to which data is inaccurate.

It is also noted that in the aforementioned example, data from only one report was used in the validation process. Embodiments of the invention allow data sets used in validation testing to be obtained from many different sources such as from different reports 190-1 through 190-M produced by the report generator 125, thus allowing cross-report validation of data as opposed to, or in conjunction with the inter-column validation explained above. Furthermore, the above example shows how validation performed by the system of the invention can detect report integrity errors. In addition, embodiments can perform data mining validation testing that can detect, or suggest the existence of configuration inconsistencies or data mining errors of resources (software or hardware) operating in the storage area network 100. As an example, the data validation mechanism 150 can be configured with (or can access in one or more configuration files) ranges of acceptable operational values for certain data values (e.g., for certain columns of data). With this information, the data validation mechanism 150 can compare the report data values to the predetermined range values to confirm that the data values associated with a resource operating in the storage area network are within a realistic operational range. If they are not, a data mining error can be signaled to the user 108 that might indicate an improper configuration of storage area network resources (e.g., equipment or software).

Using similar techniques, the data validation mechanism 150 can perform a storage area network resource compatibility test to determine compatibility of resources associated with first and second data sets (i.e., data obtained from different report data sets 195 in the database 122) based on data values associated with the resources. As an example of providing storage area network resource compatibility testing, suppose an operating system can only access devices of a limited size (e.g. 100 GB maximum). If data in a report 190 (i.e., in report data 195 used when generating a report) indicates that a host 104 running such an operating system is configured to access a device in a storage array that exceeds this size or amount of data, the data validation mechanism 150 can detect this situation (that a device access by a host exceeds allowed size limits) and can indicate this to the user 108 who can perform corrective measures to ensure that the host operating system does not experience a fault or error based on the detected inconsistency in the allowed data versus the actual data.

The aforementioned examples are meant to be illustrative only and embodiments of the invention are not limited as such. Other examples of storage area network resource compatibility testing that the data validation mechanism can be aware or and test for are such things as a software configuration inconsistency identifying incompatible software operating in the storage area network, a firmware upgrade required for a resource operating in the storage area network, a configuration inconsistency with a storage array operating in the storage area network, a configuration inconsistency of a storage area network switch operating in the storage area network, a configuration inconsistency of a host resource operating within the storage area network, a connectivity inconsistency of a coupling of resources operating within the storage area network and so on.

Figure 4:
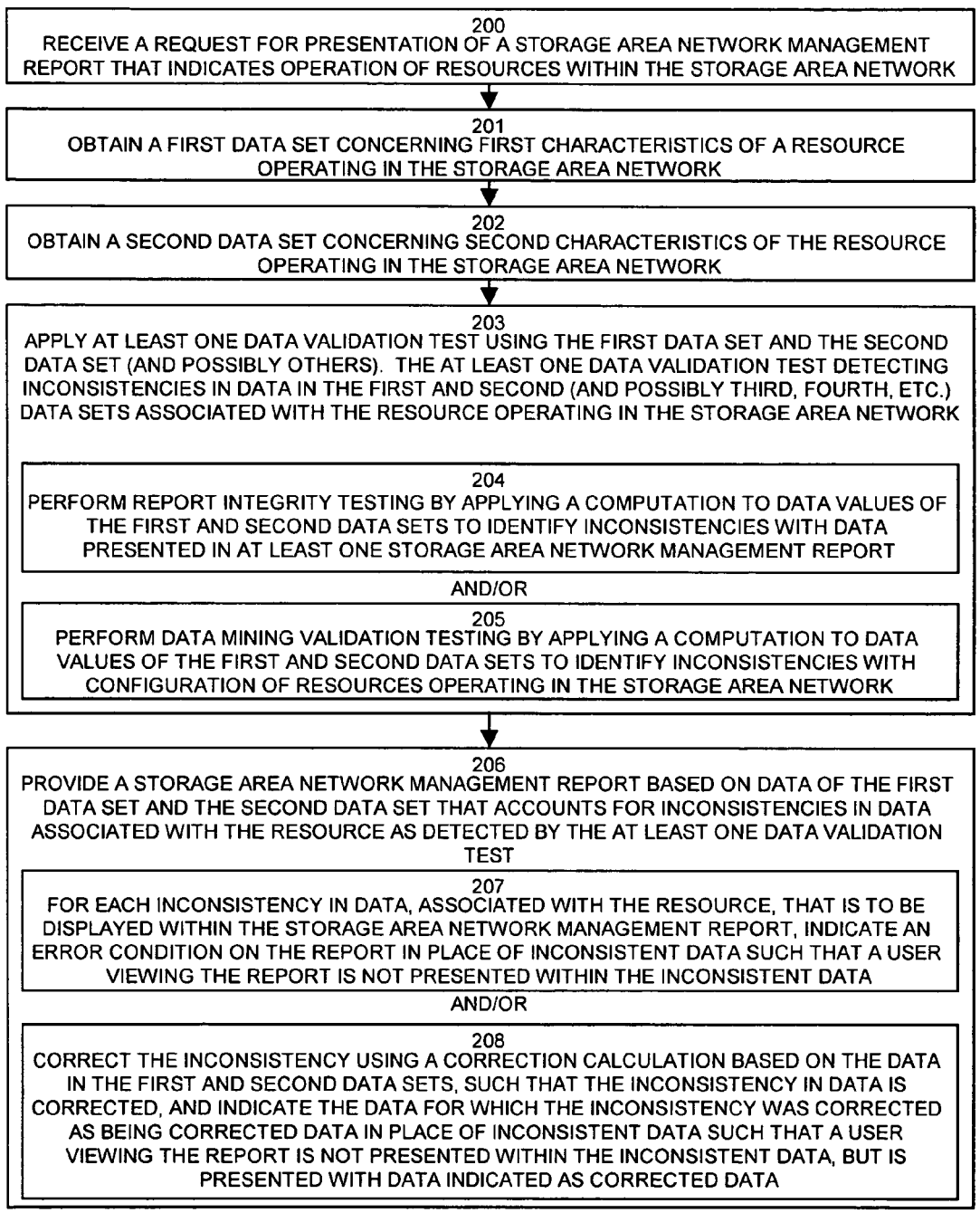
FIG. 4 is flowchart illustrating a method of performing report data validation in accordance with embodiments of the invention.

FIG. 4 is a flow chart or processing steps performed by the data validation mechanism 150 for validating data related to managed resources operating in a storage area network.

In step 200, the report generator 125 (that in this example includes the data validation mechanism 150) receives a request (e.g., from the user 108 via the graphical user interface) for presentation of a storage area network management report 190 that indicates operation of resources 102, 103 and/or 104 within the storage area network 100. In response to receipt of the request for the storage area network management report, the report generator 125 generates a report, during which time the data validation mechanism 150 performs data validation testing against data from any number of data sets at run-time using the following steps.

In step 201, the data validation mechanism 150 obtains a first data set concerning first characteristics of a resource operating in the storage area network. This can include obtaining data values that are relevant to a particular data validation test that is to be performed. As an example, the first data set may be data values from the free space column of storage report data 195 obtained form the database 122.

In step 202, the data validation mechanism 150 obtains a second data set concerning second characteristics of the resource operating in the storage area network. Continuing the above example, this step may involve the data validation mechanism 150 obtaining the used space data values form the report data 195 in the database 122.

In step 203, the data validation mechanism 150 applies at least one data validation test using the first data set and the second data set. It is noted that other data sets can be included in this data validation test as well, such as a third data set, a fourth data set and so forth. The data validation test(s) detect inconsistencies in data in the first and second data sets associated with the resource operating in the storage area network. Also, it is noted that additional data sets (e.g., a third, fourth, etc.) can be used in such testing and embodiments of the invention are not limited to only using two data sets. Furthermore, one data set may be a group of one or more predefined values (e.g., obtained from a configuration file), while another data set is obtained from report data 195.

Sub-steps 204 and 205 indicate two different types of data validation testing provided by example embodiments of the invention.

In step 204, the data validation mechanism 150 performs report integrity testing by applying a computation to data values of the first and second data sets to identify inconsistencies with data presented in at least one storage area network management report. This can include inter-column validation testing using data from different columns of the same or different reports to detect report errors in data that is to be presented to the user in the graphical user interface 150.

In step 205, the data validation mechanism 150 performs data mining validation testing by applying a computation to data values of the first and second data sets to identify inconsistencies with configuration of resources operating in the storage area network. This can allow the report generator to flag configuration problems (or potential problems) to the user 108.

Note that step 203 (and sub-steps 204 and 205) can be performed for multiple data validation tests in a repetitive manner, such that many different tests are applied to report data 195 prior to presentation and/or use of such data in a report 190 shown to the user 108.

In step 206, after data validation is complete, the data validation mechanism 150 provides a storage area network management report (e.g., 190-2-1 or 190-2-2) based on data of the first data set and the second data set (and other data sets if used) that accounts for inconsistencies in data associated with the resource as detected by the one data validation test(s). Steps 207 and 208 are sub-steps of step 206 and describe examples of how the data validation mechanism 150 accounts for inconsistencies in data.

In sub-step 207, for each inconsistency in data associated with the resource that is to be displayed within the storage area network management report, the data validation mechanism 150 indicates an error condition on the report in place of inconsistent data such that a user viewing the report is not presented within the inconsistent data.

As shown in sub-step 208, in other embodiments, for at least one inconsistency in data associated with a resource that is to be displayed within the storage area network management report, the data validation mechanism 150 corrects the inconsistency using a correction calculation based on the data in the first and second data sets, such that the inconsistency in data is corrected and indicates the data for which the inconsistency was corrected as being corrected data in place of inconsistent data. In this manner, a user viewing the report is not presented within the inconsistent data, but is presented with data indicated as corrected data. In the illustrated example management report 190-2-2, corrected data is shown in quotes as "10" and "70."

Figure 5:
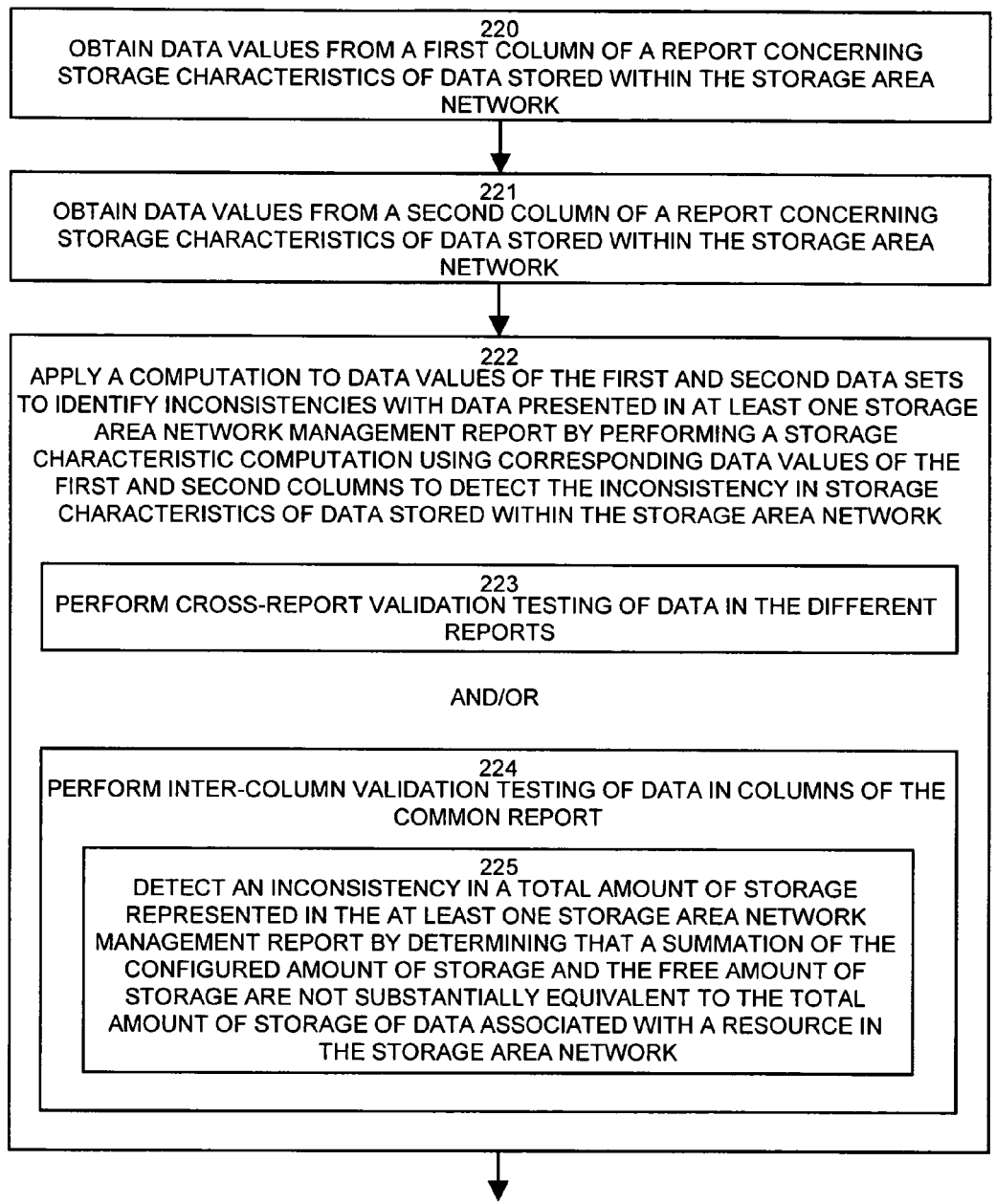

FIGS. 5 and 6 provide a more detailed flow chart of processing steps that show details of processing steps explained above for different types of data validation in accordance with example embodiments of the invention.

In step 220, the data validation mechanism 150 obtains data values from a first column of a report concerning storage characteristics of data stored within the storage area network. As an example, the first column might be free space data indicating amounts of free space in a storage system resource (e.g, device, cache, etc.), host resource (e.g., file system, volume, volume group, database, etc.) or other storage area network resource.

In step 221, the data validation mechanism 150 obtaining data values from a second column of a report concerning storage characteristics of data stored within the storage area network. Likewise, the second column can be used, configured, consumed or otherwise allocated data storage space indicating amounts of used space in a storage system resource (e.g, device, cache, etc.), host resource (e.g., file system, volume, volume group, database, etc.) or other storage area network resource.

In step 222, during application of the data validation test, the data validation mechanism 150 applies a computation to data values of the first and second data sets to identify inconsistencies with data presented in at least one storage area network management report 190 by performing a storage characteristic computation using corresponding data values of the first and second columns to detect the inconsistency in storage characteristics of data stored within the storage area network.

In one embodiment the data values are obtained in steps 220 and 221 from different reports (i.e., different sets of data 195 in the database 122 in FIG. 2) concerning storage characteristics of data stored within the storage area network and in step 223, the data validation mechanism 150 performs a storage characteristic computation by performing cross-report validation testing of data in the different reports. As an example, in cross report validation, the data validation test can compare a column in one report (e.g. a count), based on the summation of data in another report, possibly using a filter. Specific examples can include computing a number of host devices by filtering a host devices report for a storage array. This test can thus filter a "Host Devices" report by storage array and sums up a number of records and compares the count result with a count reported in an "All Arrays" report that indicated devices for all storage arrays. Thus data from two or more reports can be cross-checked. As another example, a calculation can perform a summation, using data form a first data set, of all accessible devices for a particular host and a filter can be applied to only include those devices that are accessible on certain storage arrays. This summation value can be compared to a value produced from processing a second data set that is a report summarizing devices identified in a report for all storage arrays so that the sum value from both reports are compared to ensure they are equal.

In another embodiment the data values are obtained in steps 220 and 221 from a common report concerning storage characteristics of data stored within the storage area network and in step 224, the data validation mechanism 150 performs a storage characteristic computation by performing inter-column validation testing of data in columns of the common report. Thus in this example all data from one report is used to cross-check data in that same report.

In one example, data values of first and second columns indicate storage characteristics of data stored within the storage area network that represents i) a total amount of storage; or ii) a free amount of storage; or iii) a configured amount of storage. The data values of the second column indicate a storage characteristic of data stored within the storage area network that is different than the storage characteristic of data values of the first column. Thus, if, for example, a first column (i.e., the first data set) contains data values for free storage, the second column of data (for the second data set) may be data values indicating used storage. The data validation test or computation may sum these values and compare the result to a third column such as total storage.

Accordingly, in one embodiment, as show in step 225, the data validation mechanism detects an inconsistency in a total amount of storage represented in the storage area network management report(s) by determining that a summation of the configured amount of storage and the free amount of storage are not substantially equivalent to the total amount of storage of data associated with a resource in the storage area network.

In step 226, the data validation mechanism 150 detects the inconsistency in storage characteristics of data contained in the storage area network management report(s) by determining that a data value in at least one column of the at least one storage area network management report is inconsistent with a computation applied to at least N other columns (from the same or from different reports), wherein N is any positive integer value. Thus in this step, data from any number of columns (or rows or summations for that matter) can be used in such testing.

In sub-step 227, the data validation mechanism determines that a data value in one column in the storage area network management report is not equal to a sum of corresponding data values in the at least N other columns. Thus, this specific sub-step uses a summation calculation and an inequality check as the basis of the validation testing. It is to be understood that many other types of calculations and checks can be performed and the summation calculation is presented here by way of example only.

Other examples of data validation testing can include operations performed using different types of data and different resources as well. For example, data computations can use numerical information such as amounts of raw data, database sizes, numbers of devices, file system data, volume data, configured or allocated amounts of data, block size computations, device masking information, usable data, file sizes, resource capacities, and so forth. Resources to which such data relates can include host resources such as volumes, file systems, databases, application data and user data; connectivity data; storage array data such as devices, cache amounts, and the like. Generally, all data accessible within the storage area network management application 120 can be applied to data validation testing.

Steps 228 through 230 show processing related to data mining validation testing. In particular, in step 228, the process of applying at least one data validation test (i.e. step 222) includes perform data mining validation testing by applying a computation to data values of the first and second data sets to identify inconsistencies with configuration of resources operating in the storage area network. As noted above, such configuration issues can relate to interoperability of managed resources within the storage area network 100. This type of testing can point out configuration consistencies or inconsistencies, or can identify potential storage area network management or operational issues. This type of validation can include checks that certain values are reported within realistic ranges (e.g. disk drive number or size), or it can point out potential storage area network compatibility issues. Such data mining testing may even identify required firmware upgrades.

In sub-step 229, the data validation mechanism 150 confirms that the data values associated with at least one resource operating in the storage area network are within a realistic operational range. As a result, the user 108 can be notified of potential configuration issues.

In step 230, the data validation mechanism 150 performs a storage area network resource compatibility test to determine compatibility of resources associated with the first and second data set. This can point out situations in which devices or resources may not interoperate with each other properly.

In this manner, embodiments of the invention provide the ability to perform run-time data validation as data is prepared for presentation within a graphical user interface of a storage area network management application. This can be done in report generation, or while a user is using a console to perform real-time storage area network management. While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. In a storage area network management application, a method for validating data related to managed resources operating in a storage area network, the method implemented in a computerized device in which at least one computer system accesses instructions from computer storage and executes the instructions to perform steps comprising:

obtaining a first data set concerning first characteristics of a resource operating in the storage area network, wherein obtaining the first data set includes: obtaining data values from a first section of a report concerning storage characteristics of data stored within the storage area network;

obtaining a second data set concerning second characteristics of the resource operating in the storage area network, wherein obtaining the second data set includes:

obtaining data values from a second section of a report concerning storage characteristics of data stored within the storage area network, the second section originating from one of: a same report as the first section and a different report as the first section;

applying at least one data validation test using the first data set and the second data set, the at least one data validation test detecting inconsistencies in data in the first and second data sets associated with the resource operating in the storage area network, the detected inconsistencies signifying that a value of the data in at least one of the first and second data sets misrepresents at least one of the first and second characteristics of the resource operating in the storage area network, wherein applying the data validation test includes: applying a computation to data values of the first and second data sets to identify inconsistencies with data presented in at least one storage area network management report by performing a storage characteristic computation using corresponding data values of the first and second report sections to detect the inconsistency in storage characteristics of data stored within the storage area network; and providing a storage area network management report based on data of the first data set and the second data set that accounts for inconsistencies in data associated with the resource as detected by the at least one data validation test;

wherein obtaining the first data set and the second data set each comprise obtaining data values from different reports concerning storage characteristics of data stored within the storage area network; and wherein performing the storage characteristic computation comprises performing cross-report validation testing of data in the different reports, wherein applying the at least one data validation test comprises: performing cross-report validation testing of data in the different reports by applying a computation to data values of the first and second data sets to identify inaccuracies with data presented in at least one of the different reports.

2. The method of claim 1 wherein applying at least one data validation test comprises performing report integrity testing by applying a computation to data values of the first and second data sets to identify inconsistencies with data presented in at least one storage area network management report.

3. The method of claim 1 wherein obtaining a first data set and obtaining a second data set comprise obtaining data values from a common report concerning storage characteristics of data stored within the storage area network; and wherein performing a storage characteristic computation comprises performing inter-column validation testing of data in columns of the common report.

4. The method of claim 1 wherein data values of the first column indicate a storage characteristic of data stored within the storage area network that represents at least one of:

i) a total amount of storage;

ii) a free amount of storage; and iii) a configured amount of storage; and wherein data values of the second column indicate a storage characteristic of data stored within the storage area network that is different than the storage characteristic of data values of the first column and that represents at least one of:
   i) a total amount of storage;
   ii) a free amount of storage; and
   iii) a configured amount of storage.

5. The method of claim 4 wherein performing a storage characteristic computation comprises:
   detecting an inconsistency in a total amount of storage represented in the at least one storage area network management report by determining that a summation of the configured amount of storage and the free amount of storage is equivalent to the total amount of storage of data associated with a resource in the storage area network.

6. The method of claim 1 wherein the first and second data sets contain corresponding data values from different columns of the at least one storage area network management report and wherein applying a computation to data values of the first and second data sets to identify inconsistencies with data presented in the at least one storage area network management report comprises:
   detecting the inconsistency in storage characteristics of data contained in the at least one storage area network management report by determining that a data value in at least one column of the at least one storage area network management report is inconsistent with a computation applied to at least N other columns, wherein N is any positive integer value.

7. The method of claim 6 wherein determining that a data value in at least one column of the at least one storage area network management report is inconsistent with a computation applied to at least N other columns comprises:
   determining that a data value in one column in the storage area network management report is not equal to a sum of corresponding data values in the at least N other columns.

8. The method of claim 1 wherein applying at least one data validation test comprises performing data mining validation testing by applying a computation to data values of the first and second data sets to identify inconsistencies with configuration of resources operating in the storage area network.

9. The method of claim 8 wherein applying a computation to data values of the first and second data sets to identify inconsistencies with configuration of resources operating in the storage area network comprises:
   confirming that the data values associated with at least one resource operating in the storage area network are within a realistic operational range.

10. The method of claim 8 wherein applying a computation to data values of the first and second data sets to identify inconsistencies with configuration of resources operating in the storage area network comprises:
   performing a storage area network resource compatibility test to determine compatibility of resources associated with the first and second data set.

11. The method of claim 10 wherein performing a storage area network resource compatibility test comprises:
   based on the computation applied to data values of the first and second data sets, identifying at least one inconsistencies with configuration of resources, the inconsistencies including at least one of:
   a software configuration inconsistency identifying incompatible software operating in the storage area network;
   a firmware upgrade required for a resource operating in the storage area network;
   a configuration inconsistency with a storage array operating in the storage area network;
   a configuration inconsistency of a storage area network switch operating in the storage area network;
   a configuration inconsistency of a host resource operating within the storage area network; and
   a connectivity inconsistency of a coupling of resources operating within the storage area network.

12. The method of claim 1 comprising:
   receiving a request for presentation of a storage area network management report that indicates operation of resources within the storage area network; and
   wherein the operations of obtaining a first data set, obtaining a second data set and applying at least one data validation test are performed dynamically at run-time in response to receipt of the request for the storage area network management report.

13. The method of claim 12 wherein providing a storage area network management report based on data of the first data set and the second data set that accounts for inconsistencies in data associated with the resource as detected by the at least one data validation test comprises:
   for each inconsistency in data, associated with the resource, that is to be displayed within the storage area network management report, indicating an error condition on the report in place of inconsistent data such that a user viewing the report is not presented with the inconsistent data.

14. The method of claim 12 wherein providing a storage area network management report based on data of the first data set and the second data set that accounts for inconsistencies in data associated with the resource as detected by the at least one data validation test comprises:
   for at least one inconsistency in data, associated with the resource, that is to be displayed within the storage area network management report:
   i) correcting the inconsistency using a correction calculation based on the data in the first and second data sets, such that the inconsistency in data is corrected; and
   ii) indicating the data for which the inconsistency was corrected as being corrected data in place of inconsistent data such that a user viewing the report is not presented with the inconsistent data, but is presented with data indicated as corrected data.

15. The method as in claim 1, comprising:
   wherein obtaining the first data set concerning first characteristics of the resource operating in the storage area network includes:
      obtaining at least one first data value indicating a first amount of storage in the resource;
   wherein obtaining the second data set concerning second characteristics of the resource operating in the storage area network includes:
      obtaining at least one second data value indicating a second amount of storage in the resource; and
   wherein applying the computation to data values of the first and second data sets includes applying the computation to the first data value and the second data value.

16. A computerized device comprising:
   a display;
   a memory;
   a processor;
   an interconnection mechanism coupling the display, the memory and the processor;
   wherein the memory is encoded with a storage area network management application including a data validation mechanism that, when executed on the processor, validates data related to managed resources operating in a storage area network by:

obtaining a first data set concerning first characteristics of a resource operating in the storage area network, wherein obtaining the first data set includes:
  obtaining data values from a first section of a report concerning storage characteristics of data stored within the storage area network;
obtaining a second data set concerning second characteristics of the resource operating in the storage area network, wherein obtaining the second data set includes:
  obtaining data values from a second section of a report concerning storage characteristics of data stored within the storage area network, the second section originating from one of: a same report as the first section and a different report as the first section;
applying at least one data validation test using the first data set and the second data set, the at least one data validation test detecting inconsistencies in data in the first and second data sets associated with the resource operating in the storage area network, the detected inconsistencies signifying that a value of the data in at least one of the first and second data sets misrepresents at least one of the first and second characteristics of the resource operating in the storage area network, wherein applying the data validation test includes:
  applying a computation to data values of the first and second data sets to identify inconsistencies with data presented in at least one storage area network management report by performing a storage characteristic computation using corresponding data values of the first and second report sections to detect the inconsistency in storage characteristics of data stored within the storage area network; and
providing a storage area network management report based on data of the first data set and the second data set that accounts for inconsistencies in data associated with the resource as detected by the at least one data validation test wherein obtaining the first data set and obtaining the second data set each comprise obtaining data values from different reports concerning storage characteristics of data stored within the storage area network; and
wherein performing the storage characteristic computation comprises performing cross-report validation testing of data in the different reports, wherein applying the at least one data validation test comprises:
performing cross-report validation testing of data in the different reports by applying a computation to data values of the first and second data sets to identify inaccuracies with data presented in at least one of the different reports.

17. The method of claim 16 wherein applying at least one data validation test comprises performing report integrity testing by applying a computation to data values of the first and second data sets to identify inconsistencies with data presented in at least one storage area network management report.

18. The computerized device of claim 16 wherein obtaining a first data set and obtaining a second data set comprise obtaining data values from a common report concerning storage characteristics of data stored within the storage area network; and
  wherein performing a storage characteristic computation comprises performing inter-column validation testing of data in columns of the common report.

19. The computerized device of claim 16 wherein data values of the first column indicate a storage characteristic of data stored within the storage area network that represents at least one of:
  i) a total amount of storage;
  ii) a free amount of storage; and
  iii) a configured amount of storage; and
wherein data values of the second column indicate a storage characteristic of data stored within the storage area network that is different than the storage characteristic of data values of the first column and that represents at least one of:
  i) a total amount of storage;
  ii) a free amount of storage; and
  iii) a configured amount of storage.

20. The computerized device of claim 19 wherein performing a storage characteristic computation comprises:
  detecting an inconsistency in a total amount of storage represented in the at least one storage area network management report by determining that a summation of the configured amount of storage and the free amount of storage are not substantially equivalent to the total amount of storage of data associated with a resource in the storage area network.

21. The computerized device of claim 16 wherein the first and second data sets contain corresponding data values from different columns of the at least one storage area network management report and wherein applying a computation to data values of the first and second data sets to identify inconsistencies with data presented in the at least one storage area network management report comprises:
  detecting the inconsistency in storage characteristics of data contained in the at least one storage area network management report by determining that a data value in at least one column of the at least one storage area network management report is inconsistent with a computation applied to at least N other columns, wherein N is any positive integer value.

22. The computerized device of claim 21 wherein determining that a data value in at least one column of the at least one storage area network management report is inconsistent with a computation applied to at least N other columns comprises:
  determining that a data value in one column in the storage area network management report is not equal to a sum of corresponding data values in the at least N other columns.

23. The computerized device of claim 16 wherein applying at least one data validation test comprises performing data mining validation testing by applying a computation to data values of the first and second data sets to identify inconsistencies with configuration of resources operating in the storage area network.

24. The computerized device of claim 23 wherein applying a computation to data values of the first and second data sets to identify inconsistencies with configuration of resources operating in the storage area network comprises:
  confirming that the data values associated with at least one resource operating in the storage area network are within a realistic operational range.

25. The computerized device of claim 23 wherein applying a computation to data values of the first and second data sets to identify inconsistencies with configuration of resources operating in the storage area network comprises:
  performing a storage area network resource compatibility test to determine compatibility of resources associated with the first and second data set.

26. The computerized device of claim 25 wherein performing a storage area network resource compatibility test comprises:
  based on the computation applied to data values of the first and second data sets, identifying at least one inconsistencies with configuration of resources, the inconsistencies including at least one of:
a software configuration inconsistency identifying incompatible software operating in the storage area network;
a firmware upgrade required for a resource operating in the storage area network;
a configuration inconsistency with a storage array operating in the storage area network;
a configuration inconsistency of a storage area network switch operating in the storage area network;
a configuration inconsistency of a host resource operating within the storage area network; and
a connectivity inconsistency of a coupling of resources operating within the storage area network.

27. The computerized device of claim 16 comprising:
receiving a request for presentation of a storage area network management report that indicates operation of resources within the storage area network; and
wherein the operations of obtaining a first data set, obtaining a second data set and applying at least one data validation test are performed dynamically at run-time in response to receipt of the request for the storage area network management report.

28. The computerized device of claim 27 wherein providing a storage area network management report based on data of the first data set and the second data set that accounts for inconsistencies in data associated with the resource as detected by the at least one data validation test comprises:
for each inconsistency in data, associated with the resource, that is to be displayed within the storage area network management report, indicating an error condition on the report in place of inconsistent data such that a user viewing the report is not presented with the inconsistent data.

29. The computerized device of claim 27 wherein providing a storage area network management report based on data of the first data set and the second data set that accounts for inconsistencies in data associated with the resource as detected by the at least one data validation test comprises:
for at least one inconsistency in data, associated with the resource, that is to be displayed within the storage area network management report:
i) correcting the inconsistency using a correction calculation based on the data in the first and second data sets, such that the inconsistency in data is corrected; and
ii) indicating the data for which the inconsistency was corrected as being corrected data in place of inconsistent data such that a user viewing the report is not presented with the inconsistent data, but is presented with data indicated as corrected data.

30. A computer program product including a computer-readable medium having instructions encoded thereon that include a data validation mechanism that, when executed in a processor of a computerized device, operates in a storage area network management application to validate data related to managed resources operating in a storage area network by performing the operations of:
obtaining a first data set concerning first characteristics of a resource operating in the storage area network, wherein obtaining the first data set includes: obtaining data values from a first section of a report concerning storage characteristics of data stored within the storage area network;
obtaining a second data set concerning second characteristics of the resource operating in the storage area network, wherein obtaining the second data set includes: obtaining data values from a second section of a report concerning storage characteristics of data stored within the storage area network, the second section originating from one of: a same report as the first section and a different report as the first section;
applying at least one data validation test using the first data set and the second data set, the at least one data validation test detecting inconsistencies in data in the first and second data sets associated with the resource operating in the storage area network, the detected inconsistencies signifying that a value of the data in at least one of the first and second data sets misrepresents at least one of the first and second characteristics of the resource operating in the storage area network, wherein applying the data validation test includes: applying a computation to data values of the first and second data sets to identify inconsistencies with data presented in at least one storage area network management report by performing a storage characteristic computation using corresponding data values of the first and second report sections to detect the inconsistency in storage characteristics of data stored within the storage area network; and
providing a storage area network management report based on data of the first data set and the second data set that accounts for inconsistencies in data associated with the resource as detected by the at least one data validation test wherein obtaining the first data set and obtaining the second data set each comprise obtaining data values from different reports concerning storage characteristics of data stored within the storage area network; and
wherein performing the storage characteristic computation comprises performing cross-report validation testing of data in the different reports, wherein applying the at least one data validation test comprises:
performing cross-report validation testing of data in the different reports by applying a computation to data values of the first and second data sets to identify inaccuracies with data presented in at least one of the different reports.

31. A computerized device comprising:
a display;
a memory;
a processor;
an interconnection mechanism coupling the display, the memory and the processor;
wherein the memory is encoded with a storage area network management application including a data validation mechanism, that when executed on the processor, provides a means for validating data related to managed resources operating in a storage area network, said means including:
means for obtaining a first data set concerning first characteristics of a resource operating in the storage area network, wherein the means for obtaining the first data set include: means for obtaining data values from a first section of a report concerning storage characteristics of data stored within the storage area network;
means for obtaining a second data set concerning second characteristics of the resource operating in the storage area network, wherein the means for obtaining the second data set include: means for obtaining data values from a second section of a report concerning storage characteristics of data stored within the storage area network, the second section originating from one of: a same report as the first section and a different report as the first section;
means for applying at least one data validation test using the first data set and the second data set, the at least one data validation test detecting inconsistencies in data in the first and second data sets associated with the resource operating in the storage area network, the detected inconsistencies signifying that a value of the data in at least one of the first and second data sets misrepresents at least one of the first and second characteristics of the resource operating in the storage area network, wherein the means for applying the data validation test include: applying a computation to data values of the first and second data sets to identify inconsistencies with data presented in at least one storage area network management report by performing a storage characteristic computation using corresponding data values of the first and second report sections to detect the inconsistency in storage characteristics of data stored within the storage area network; and means for providing a storage area network management report based on data of the first data set and the second data set that accounts for inconsistencies in data associated with the resource as detected by the at least one data validation test wherein the means for obtaining the first data set and obtaining the second data set each comprise means for obtaining data values from different reports concerning storage characteristics of data stored within the storage area network; and wherein the means for performing the storage characteristic computation comprises means for performing cross-report validation testing of data in the different reports, wherein the means for applying the at least one data validation test comprises:

means for performing cross-report validation testing of data in the different reports by applying a computation to data values of the first and second data sets to identify inaccuracies with data presented in at least one of the different reports.

* * * * *